(No Model.) 2 Sheets—Sheet 1.
T. E. SMITH.
KITCHEN CABINET.
No. 531,341. Patented Dec. 25, 1894.
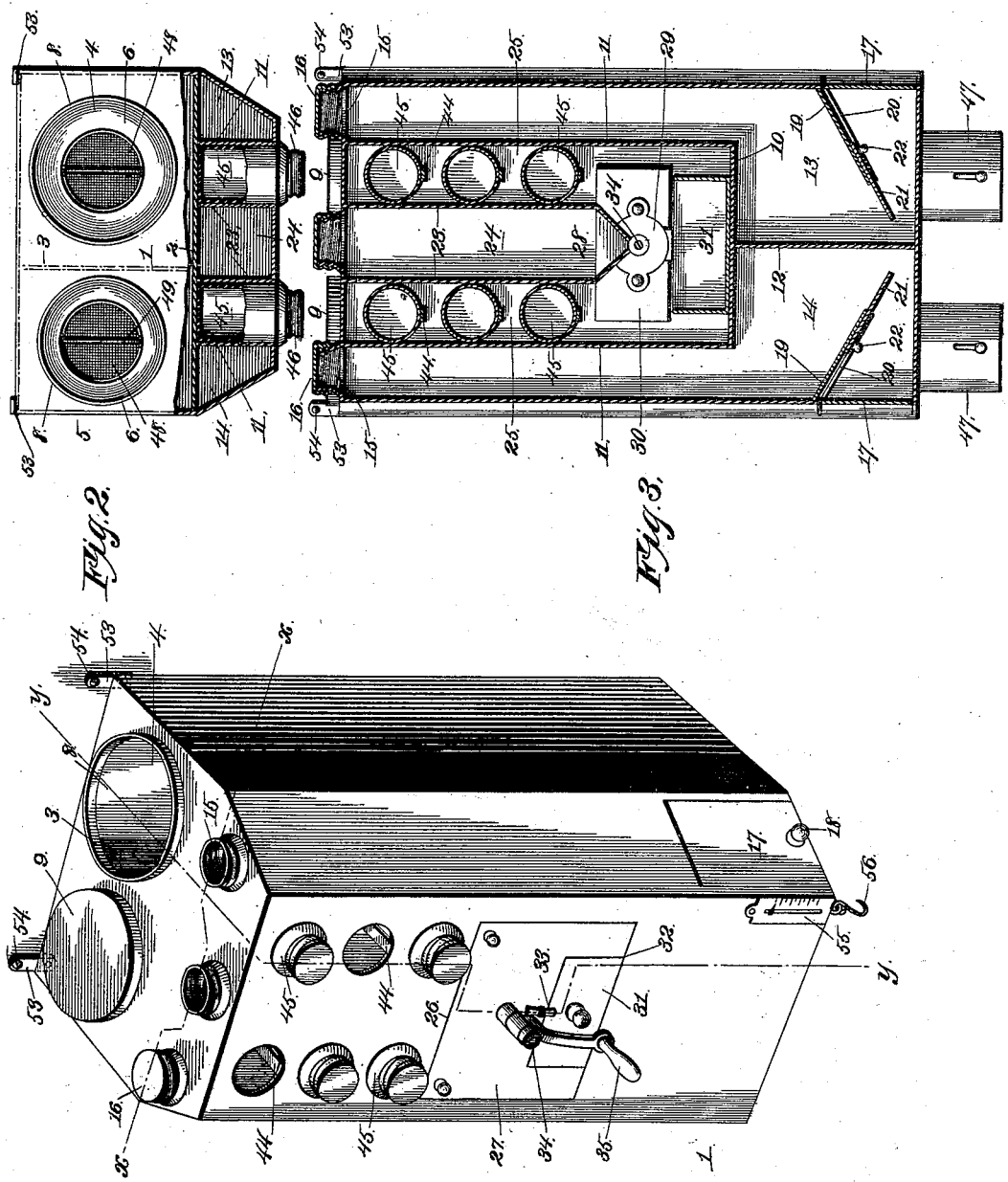
Witnesses:
Inventor:
Thomas E. Smith,
By Higdon & Higdon
Attys.

(No Model.)  
2 Sheets—Sheet 2.
T. E. SMITH.
KITCHEN CABINET.
No. 531,341. Patented Dec. 25, 1894.
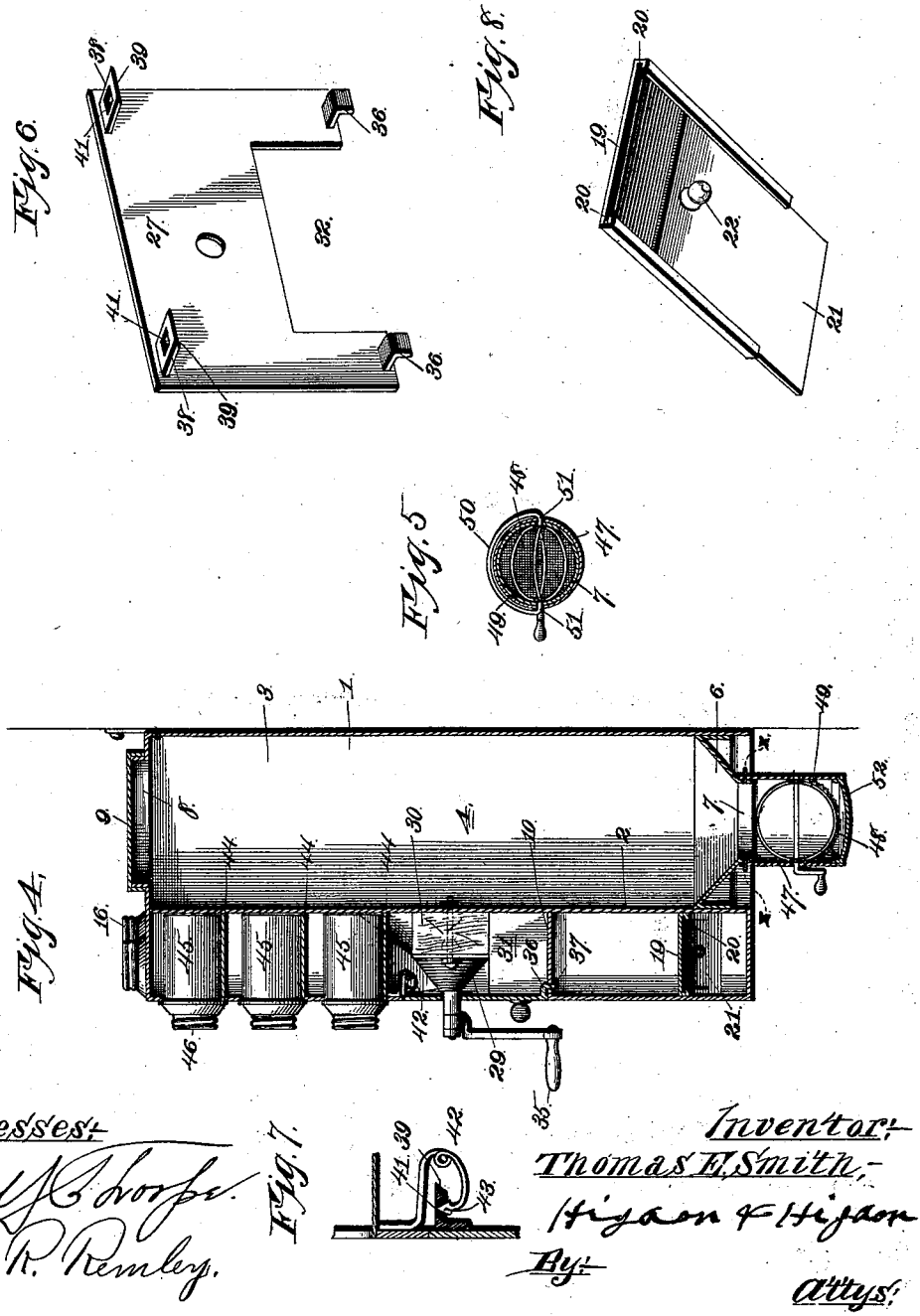

UNITED STATES PATENT OFFICE.

THOMAS E. SMITH, OF KANSAS CITY, MISSOURI.

KITCHEN-CABINET.

SPECIFICATION forming part of Letters Patent No. 531,341, dated December 25, 1894.

Application filed April 6, 1894. Serial No. 506,551. (No model.)

*To all whom it may concern:*

Be it known that I, THOMAS E. SMITH, of Kansas City, Jackson county, Missouri, have invented certain new and useful Improvements in Kitchen-Cabinets, of which the following is a full, clear, and exact description, reference being had to the accompanying drawings, forming a part hereof.

My invention relates to kitchen cabinets, and has for its object to produce a device of this character which is simple, strong, durable, and inexpensive of construction; which is air-tight in all its compartments; and which, when suspended upon the wall of a room, adjusts itself to the altered position of the house-timbers due to the expansion, contraction or settling of the building.

With these objects in view, and others, as hereinafter appear, the invention consists in its peculiar construction and arrangement of parts, as hereinafter described and claimed.

In order that the invention may be fully understood, reference is to be had to the accompanying drawings, in which—

Figure 1. is a perspective view of a kitchen cabinet constructed in accordance with my invention. Fig. 2. represents a view partly in plan and partly in section. Fig. 3. represents a vertical sectional view taken on the line $x$—$x$ of Fig. 1. Fig. 4. represents a vertical sectional view taken on the line $y$—$y$ of Fig. 1. Fig. 5. represents a sectional view taken on the line $z$—$z$ of Fig. 4. Fig. 6. represents a detail perspective view enlarged, of the detachable front plate. Fig. 7. represents a vertical sectional view to show the means for securing said detachable plate in its elevated position. Fig. 8. is a detail perspective view of an adjustable partition.

In the said drawings, 1 designates a casing of any suitable or preferred depth, and of hexagonal form approximately in plan view. A vertical and transverse partition 2 extends from side-wall to side-wall and from the upper end to the lower end of the casing, and is arranged a suitable distance from and parallel with the rear wall of the casing, and connecting said partition and the rear wall of the casing, is the vertical partition 3, which is arranged to one side of the center of the casing, so as to form a large or flour compartment 4, and a smaller or meal compartment 5, and the bottom of each of these compartments tapers downwardly and inwardly to form a circular opening, which is marginally surrounded by the vertically depending flange 7, and this flange is provided with diametrically opposite holes or apertures, for a purpose hereinafter explained. Circular openings 8 in the top of the casing, which communicate with the compartments 4 and 5, are marginally surrounded by vertical and upwardly projecting flanges, which are detachably engaged by the caps or covers 9. A horizontal partition 10, connects the partition 2 and the front wall of the casing a suitable distance from its lower end, and extending vertically upward from the opposite ends of the said partition 10, and a suitable distance inward of and parallel with the side walls of the casing, are the vertical partitions 11; said partitions extending to the top of the casing.

A vertical partition 12 is arranged centrally of the casing, and connects the partition 10 and the bottom of the casing, and the partition 2 and the front wall of the casing, respectively, so as to form, in conjunction with the partition 10, the partitions 11, and the sides and bottom of the casing, the similar compartments 13 and 14, and the opening 15, communicating with each of said compartments, is surrounded by a threaded flange, which is engaged by a screw cap or cover 16. The outer sides of these compartments are formed by the oblique or inclined sides of the casing, and hinged at their upper ends in the openings formed in the lower ends of said sides, and normally closing said openings, are the doors 17, provided with the handle-buttons 18, in the ordinary manner. Connecting the partition 2 and the front wall of the casing, are deflectors or guide partitions 19, which converge downwardly and inwardly from and above the upper ends of the hinged doors 17, and these guide partitions are formed at their under sides with the oppositely disposed grooves 20, in which are slidingly mounted the partitions 21, provided with buttons or handle projections 22 at their under sides. It will be apparent by this construction, that the contents of the compartments 13 and 14 will first be deflected toward the inner sides of the same, and that more or less of the sugar or rice contained in these compartments may be allowed to descend below said partitions 19 by the proper adjustment of the partitions 21. It will be apparent were these guide partitions not provided, that a catch would be needed to prevent the hinged doors 17 from being forced open by the contents of the compartments, and even then, before the doors were opened a receptacle would have to be placed below the opening to catch the sugar or other substance which would immediately fall through said opening and continue falling as long as the door remained open, until the compartment was nearly exhausted, and it will be clearly obvious that with the construction illustrated, the quantity allowed to descend to the bottom of the compartment may be regulated, or entirely cut off if desired, so that the doors may be opened at any time with impunity, and the contents may be removed by means of a scraper or any other suitable article.

Connecting the partition 2 and the front wall of the casing, and arranged a suitable distance apart and inward of the vertical partitions 11, and parallel therewith, are the partitions 23, which thus divide the space between the partitions 11 into a central or coffee compartment 24, and side compartments 25, communicating at their lower ends below the said coffee compartment, which projects a suitable distance below the upper margin of the opening 26 in the front wall of the casing, which is normally closed by the detachable plate 27, and the partitions 23 converge at their lower ends, and in conjunction with the converging plate 28, which forms the inclined bottom of the coffee compartment, form the hopper of a coffee-mill 29, of the usual or any preferred construction; said coffee-mill being mounted upon a block 30, which is bolted to the front side of the partition 2, so that it may be removed from position should it need repair, or any other cause.

A drawer 31, is located beneath the coffee-mill, and resting upon the partition 10, occupies the recess 32 formed in the detachable plate 27, and is secured from accidental displacement by the turn-button 33, carried by said detachable plate. From this construction, it will be apparent that the drawer may be removed from position without displacing the plate 27, and also replaced in position beneath the coffee-mill. The detachable plate 27 is also provided with an enlarged aperture, through which projects loosely the shaft 34 of the coffee-mill, and mounted operatively upon said shaft is the crank-handle 35. The detachable plate 27 is provided at its inner side and lower corners, with the angular projections 36, which have a limited pivotal movement in the vertical apertures 37 in the partitions 10 of the casing, and is also provided at its inner side and near its upper corners with the inwardly projecting plates 38, the inner margins of which are beveled or inclined inwardly and upwardly, as shown at 39, and said plates are provided, also, with the apertures 41, the front and rear walls of which converge upwardly, and engaging said aperture is the angular head 43 of a spring-catch 42, which is carried by the front wall of the casing just above the upper margin of the opening 26. It will be apparent, from this construction, that when the plate 27 is grasped near its upper corners and pulled outwardly, owing to the beveled formation of the heads 43 and the openings 41, the spring 42 will yield, and allow said plate to move outwardly, and the angular projections 36 will pivotally operate in the apertures 37, this movement being permitted because the shaft of the coffee-mill does not fit closely the aperture of said plate, but projects loosely therethrough to allow of sufficient movement to accomplish the object in view,—viz: the slight pivotal operation of the plate, so that said plate 27 may be lifted bodily from position, after the crank handle 35 is removed from the coffee mill shaft to give access to the coffee-mill, should it be necessary or desirable.

The front wall of the casing, opposite the compartments 25, is provided with two series of circular and vertically aligned openings, and extending rearwardly and centrally from the lower margin of these openings to the partition 2, are horizontal supporting strips or plates 44, and fitting snugly within said circular openings, and resting upon said strips or plates are the circular casings for spices, &c., 45, which are closed and made air-tight by the screw-caps 46. The sifters consist of short vertical cylinders 47, which are provided near their lower ends with the concave or semicircular screens 48, against which operate the rotary sifters 49, of the ordinary construction. The cylinders 47, at their upper ends, embrace the depending and circular flanges 7 of the compartments 4 and 5, and semicircular spring-clasps or half-rings 50, are provided with inwardly projecting arms 51, which engage the aligned apertures in the upper end of the cylinders and said depending flanges, and thus support the cylinders in position and prevent any accidental displacement of the same, because it is first necessary to spring the semicircular clasp outwardly to disengage the arms 51 from said apertures. The lower ends of the cylinders, when the sifters are not in operation, are closed by removable bottoms 52.

Metallic bars or strips 53 are pivotally connected at their lower ends to the rear side and upper corners of the casing 1, and these strips 53 at their upper ends are pivotally mounted upon bolts or screws 54, which engage the vertical timbers in the side of the building; the casing being preferably equal in width to the space from center to center between said timbers. It will be apparent, from this construction, that should these timbers move slightly apart, owing to the expansion, or move nearer together, owing to the contraction of the building, or from other cause their relative position be slightly altered, the supporting bars or links 53 will, by pivotal action, adjust themselves so as to always support the casing in its vertical position.

Carried by and secured to the front wall of the casing, so that it shall not project beyond the face thereof, is the spring-scale 55, the hook 56 of which projects below the bottom of the casing, and in a convenient position, so that the weight or quantity of meal or flour or any other article or substance may be ascertained. It will be apparent, from this construction, by employing the detachable spice casings, and providing each with an independent screw-cap, that they may be removed from the casing at any time so that a portion of their contents may be extracted, and their caps secured thereon without the necessity of replacing the spice casings in position in the casing, as their contents when the caps are on are protected as fully from the air when out of the casing as when in, as is not the case where drawers are employed, which expose the contents as long as the drawer remains open, as they are provided with no covers, and also that the removal of these casings will not admit air to injuriously affect the contents of the other compartments or casings; also, by providing the coffee-compartment, with the screw-cap or cover, that all the aroma of the coffee is retained in said compartment, and is not allowed to escape.

From the above description, it will be apparent that I have produced a kitchen cabinet which is perfectly air-tight, which is simple, strong, durable, and inexpensive of construction, and which is not liable to injury, because it is supported adjustably upon the wall.

Having thus described my invention, what I claim as new, and desire to secure by Letters Patent, is—

1. In a kitchen cabinet, the combination with a suitable casing provided with two vertical partitions to form a central coffee compartment, a cover therefor, a horizontal partition to form a chamber below the coffee compartment, a coffee-grinder therein, and a drawer below the discharge opening of the coffee-grinder, and resting upon said horizontal partition, of a plate fitting detachably in an opening in the front wall of the casing and provided with a notch through which the said drawer projects, and an aperture through which the shaft of the coffee-grinder projects, substantially as set forth.

2. In a kitchen cabinet, the combination with a suitable casing provided with a coffee-compartment, a coffee-grinder located below said coffee-compartment and communicating therewith, and a drawer located below the discharge opening of the coffee-grinder, of a plate fitting in an opening in the front wall of the casing, and having a notch, through which the said drawer projects, and an aperture through which the shaft of the coffee-grinder projects, angular projections pivotally engaging apertures in the partition upon which the drawer is supported, apertured plates projecting inwardly from the upper corners of said plates, and spring catches engaging the apertures of said plates, to yieldingly hold the detachable plate in its closed position, a crank-handle mounted upon the outer end of the coffee-grinder shaft, and a turn-button carried by the detachable plate and holding the drawer in position, substantially as set forth.

In testimony whereof I affix my signature in presence of two witnesses.

THOS. E. SMITH.

Witnesses:
 ED. WHEELER,
 M. R. REMLEY.